United States Patent Office 3,156,116
Patented Nov. 10, 1964

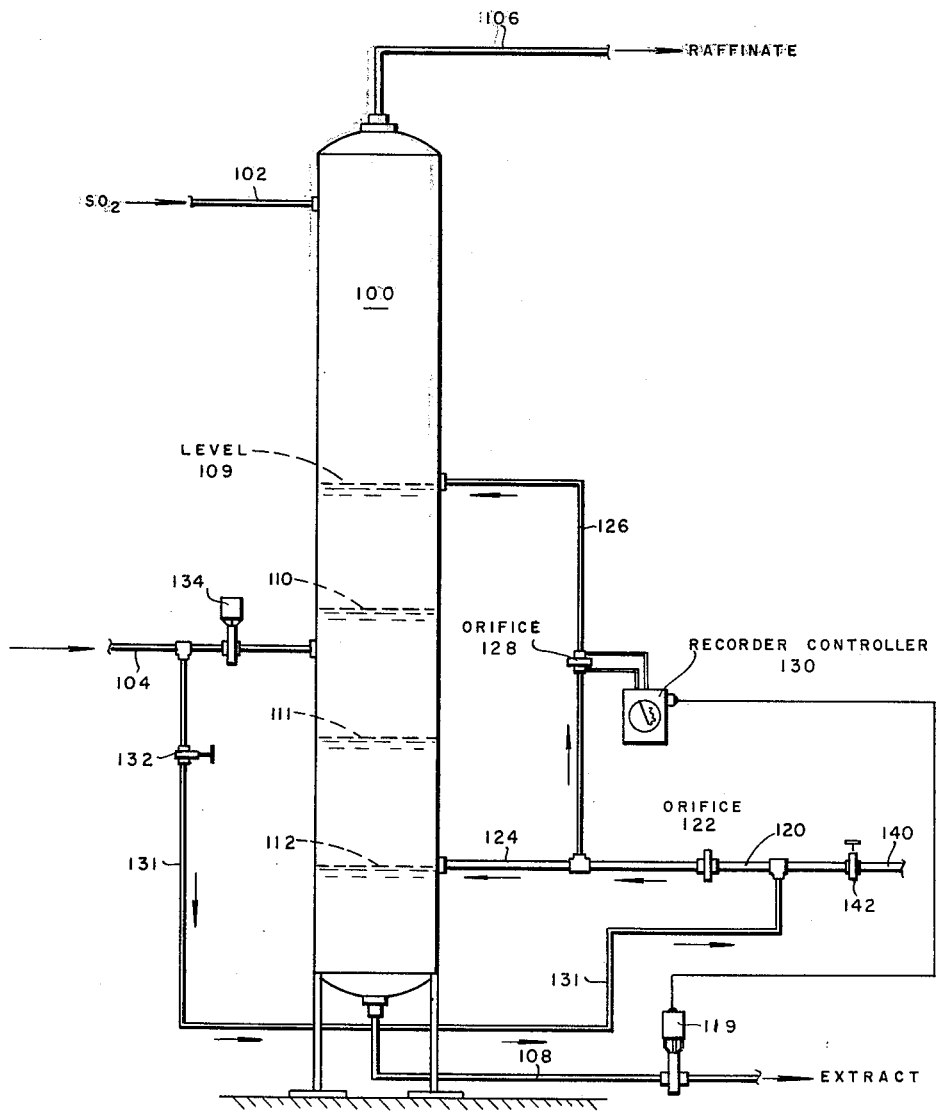

3,156,116
MEASUREMENT OF LIQUID LEVEL
Paul B. Land, Baytown, Tex., assignor, by mesne assignments, to Esso Research and Engineering Company, Elizabeth, N.J., a corporation of Delaware
Filed Oct. 1, 1962, Ser. No. 227,260
4 Claims. (Cl. 73—302)

The present invention is directed to the measurement of liquid levels. More particularly, the present invention is directed to the measurement of liquid levels within processing vessels wherein, by reason of the conditions within the vessels, the nature of the fluids involved, or other factors, a direct sight-glass comparison of the level within the vessels can be made only with difficulty.

In processing units of various natures within a petroleum refinery, the problem often arises of determining accurately the level of an interface between two liquids or between a liquid and a gas. In the common situation, the absolute pressure within the vessel varies with operating conditions, and, thus, a calibration of the absolute pressure at the bottom of the tower would not give an indication of the liquid level. Further, for example, in processes like the $SO_2$ extraction of an aromatic hydrocarbon such as xylene or toluene and the like, the temperature and boiling point of the materials within the tower are such that the use of a sight glass in attempting to determine the liquid level would transfer sufficient heat into the material to boil the $SO_2$ within the sight glass so that a determination of liquid level could not be made. In acid catalyzed alkylation and like processes, the present invention can be used to avoid the danger of accidental breakage and resultant leakage of corrosive liquids.

Further, the use of a sight glass in determining liquid level of this nature is not adaptable for use as a control sensor, such that level control could be accomplished by the same means which is indicating the absolute position of that level.

By the practice of the present invention, it has been found that by flowing a purge stream through a branched metering run, one conduit terminating above the range of level fluctuations and the other conduit terminating in the column below the level of fluctuations, the liquid level will be indicated by a measurement of the rate of flow of the purge stream through one of the two branches. In accomplishing this, the unmetered branch is made of a sufficiently greater cross-sectional area than the most restricted portion of the second branch so that surges and changes in pressure within the tower or in the purge stream itself will be reflected almost entirely in a change of rate of flow in the larger conduit, rather than in the branched or more restricted conduit.

Suitably, the present invention may comprise a branched conduit, each branch being of the same diameter pipe, but the second branch containing an orifice which is utilized both to produce pressure drop as well as to measure the rate of flow within the branched column. Or, the sizes of the various lines may be adjusted in order to assure that the flow surges will obtain more in the bottom pipe than in that branch which is having the flow metered.

By reference to the drawing, the present invention is shown as installed for use in the $SO_2$ extraction of xylene or toluene and the like. The extraction vessel 100 is shown as being served by an $SO_2$ inlet line 102 and a toluene or xylene inlet line 104. The raffinate is removed overhead by line 106 and the rich extract is removed from the bottoms by way of line 108. The liquid level within the contacting vessel may vary continuously from the point 109 through levels 110 and 111 to a lower point of 112. At any given intermediate level, the relative amounts of $SO_2$ and hydrocarbon must be sensed in order to control both the process as well as to obtain meaningful information as to the efficiency of the operation of the extraction process.

The level measuring and controlling apparatus of the present invention is shown as comprising a purge stream inlet line 120, which may suitably contain a choke orifice 122. The purge line 120 is split into two sections, the lower section 124 being run directly and unrestricted into the column at the lowest level to be measured. Section 124 is of a large diameter so that the pressure drop within section 124 is negligible when considering the expected rate of flow of the purge stream in that line. The second branch 126 is passed upwardly from line 124 and enters the tower at the level 109, and contains an orifice 128, which is provided with a differential pressure measuring means, such as the differential pressure cell (DP cell) commonly in use, and a recorder controller 130 which is operated by a pneumatic signal from the DP cell proportional to the pressure differential across the orifice and, therefore, proportional to the rate of flow. The recorder-controller 130 indicates this differential pressure. Since the rate of flow is directly related to the interface level, the recorder-controller 130 may be calibrated to indicate directly the level of the interface or pseudo-interface within the vessel 100. A pseudo-interface is an emulsified layer which lies between the two discrete phases.

An output signal from the controller 130 may be used to control one of the flowing streams in order to control the liquid level within the tower. For example, the extract line 108 may be controlled by operating valve 119 with the output from controller 130. Alternatively, the control signal from controller 130 may be used to vary the flow of the $SO_2$ feed through line 102.

As shown in the drawing, the purge stream may suitably be obtained from the hydrocarbon feed line 104 by way of line 131 controlled by valve 132. The feed is obtained upstream of the feed control valve 134 in order to minimize pressure fluctuations which would be obtained. Alternatively, the purge fluid may be passed into line 120 from a relatively constant pressure source by way of line 140 controlled by valve 142, and under these conditions valve 132 would be shut. The purge stream can be any fluid not incompatible with the materials in the vessel, and which can be used at a flow rate sufficient to measure pressure drop in line 124.

Thus, it is seen that a dependable control system, which is independent of visual examination, is provided for determining the control level within a tower.

Another advantage to the use of the present invention is that in controlling those processes wherein the phases may not exist with a clear interface, but rather in a somewhat emulsified condition, the relative amounts of the fluid within the tower can be accurately determined as a pseudo-interface regardless of the actual existence or lack of existence of an interface, and meaningful control may be predicated upon the instrument readings regardless of the emulsified nature within the tower.

It has been stated that the choke 122 is not absolutely necessary, but is used as a means of minimizing the absolute rate of flow through the metering system. This tends also to reduce the effect of surges in the purge stream line and pressure changes within the vessel 100. Thus, where the purge line 120 is used, riding upon the hydrocarbon feed line, the choke orifice 122 is highly effective in minimizing the flow fluctuations in the metering system. Where a purge stream from a relatively constant pressure source is available at low flow rates, however (for example, by way of line 140), the choke 122 may be omitted and the disparity of cross-sectional area in the lines 124 and 126 may be relied upon to prevent erroneous readings.

As exemplary of the ratio between the larger flow line 124 and the smaller flow in line 126, the entire metering system may be formed of one-half inch pipe, having an inside diameter of 0.546 inch. The orifice 128 may then be formed with a 0.0595 inch diameter in order to provide a desired relative disparity between cross-sectional areas. It is to be pointed out that the relation in cross-sectional area between the pipe 124 and the minimum restriction in line 126 is such that changes in flow through the metering system are thrown substantially entirely through line 124 rather than through the leg 126. A good workable range in cross-sectional area between the two lines is between about 50:1 to about 100:1. Another way of stating the relationship is that the resistance to flow in the measured line 126 is from 50 to 100 times that of the unmeasured line 124.

Thus, a system has been disclosed for measuring liquid level which is independent of visual examination, and which may be used to great advantage in systems wherein highly corrosive material, radioactive material, materials which emulsify, etc., are retained in a dual phase, having a liquid-liquid interface, a liquid-gas interface, or a pseudo-interface. What is to be covered by the claims of the present invention should be limited not by the specific examples herein given, but rather by the scope of the appended claims.

I claim:

1. Apparatus for measuring an interface within a vessel which comprises a purge line having an unrestricted branch and a restricted branch, each opening into and communicating with said vessel, said unrestricted branch opening into and communicating with said vessel at a point substantially lower than said restricted branch, means for passing a purge stream in small quantities through both of said branches, and means for determining the rate of flow through said restricted branch, wherein the cross-sectional area of said unrestricted lower branch is from 50 to 100 times that of the most restricted portion of said restricted branch.

2. Apparatus comprising a vessel having at least one fluid inlet means and one fluid outlet means, first unrestricted purge line means opening into and communicating with said vessel at a lower point thereof, restricted purge line means connecting said unrestricted purge line means with a higher point in said vessel, means for restricting the flow of purge fluid through said restricted purge line means, means for determining the rate of flow in said restricted purge line means, conduit means connecting said fluid inlet means with said purge line means whereby a portion of the liquid feed to said vessel is directed through said purge line means, and choke orifice means in said purge line means intermediate said conduit means and said restricted purge line means.

3. Apparatus in accordance with claim 2 further comprising means for controlling said fluid outlet stream in response to said fluid flow measuring means.

4. Apparatus in accordance with claim 2 wherein the resistance to flow in said restricted purge line means is from 50 to 100 times as great as the resistance to flow in said unrestricted purge line means.

References Cited in the file of this patent
UNITED STATES PATENTS

| | | |
|---|---|---|
| 2,033,153 | Saruchanoff | Mar. 10, 1936 |
| 2,331,208 | Ludi | Oct. 5, 1943 |